W. G. PRICE.
SEPARATOR FOR ELLIPTIC SPRINGS.
APPLICATION FILED JUNE 17, 1908.
960,396.
Patented June 7, 1910.
FIG. 1
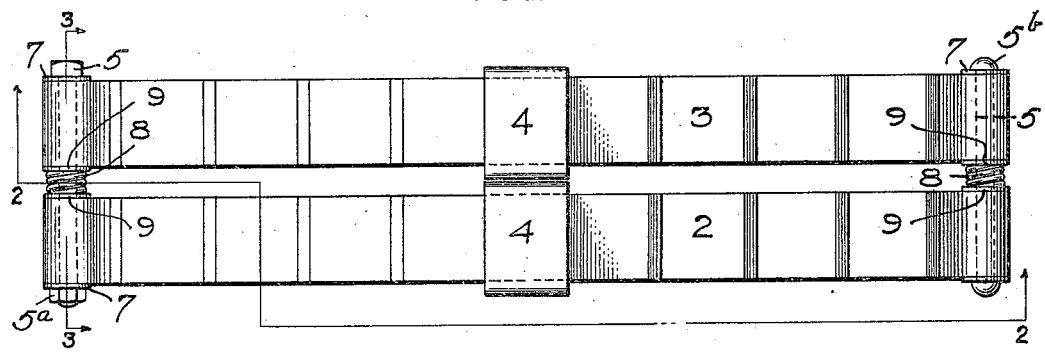
FIG. 2
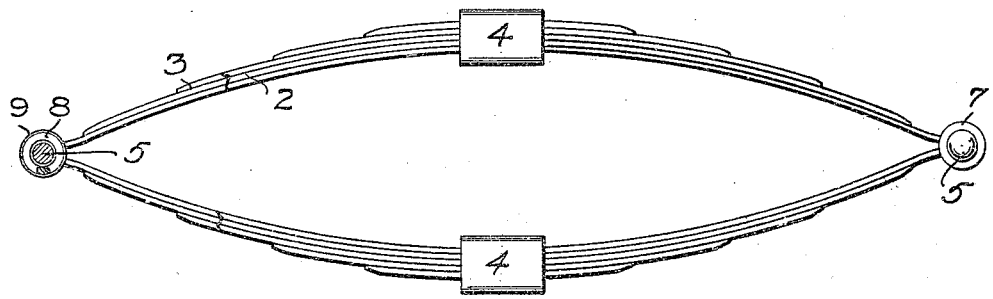
FIG. 3
FIG. 4
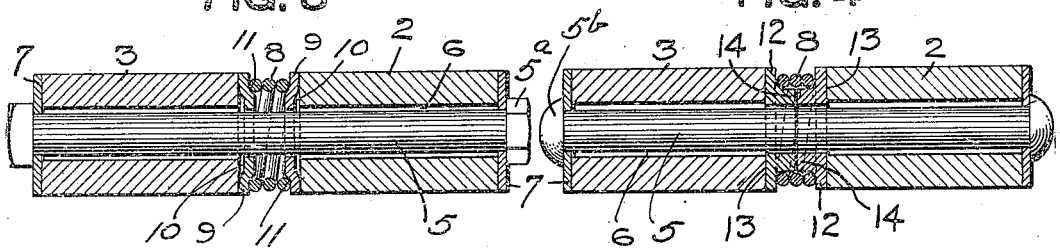
WITNESSES.
J. R. Keller
Robert C. Totten
INVENTOR.
William G. Price
By Kay & Totten
attorneys

UNITED STATES PATENT OFFICE.

WILLIAM GUNN PRICE, OF NEW CASTLE, PENNSYLVANIA.

SEPARATOR FOR ELLIPTIC SPRINGS.

960,396.      Specification of Letters Patent.     Patented June 7, 1910.

Application filed June 17, 1908. Serial No. 438,994.

*To all whom it may concern:*

Be it known that I, WILLIAM G. PRICE, a resident of New Castle, in the county of Lawrence and State of Pennsylvania, have invented a new and useful Improvement in Separators for Elliptic Springs; and I do hereby declare the following to be a full, clear, and exact description thereof.

My invention relates to elliptic springs for railway cars and other conveyances. In this class of springs it is customary to connect up several sets of springs to form duplicate, triplicate, etc., springs, and the several members comprising the springs are connected at their ends by means of bolts passing therethrough. In order to space or separate the several members of the spring it has been customary to interpose rings of solid steel, properly hardened, between the several sets of springs from which the connecting bolts pass, the faces of said rings bearing closely against the contiguous faces of the springs. The movement of the springs when the car is in motion tends to wear the faces of the interposed rings and said rings become loose on the bolts so that they cause a rattling when the car is in motion, and furthermore, these loose rings tend to wear and cut into the connecting bolts so as to weaken the same and in some instances even entirely cutting through said bolts.

The object of my invention is to provide a spring in which the sets of springs are divided or spaced in such a way as to prevent the rattling and noise, any wear being taken up automatically so that the springs are held tight and secure, and to these ends my invention comprises the novel features hereinafter set forth and claimed.

In the drawing Figure 1 is a plan view of my invention; Fig. 2 is a part section on the line 2—2, Fig. 1; Fig. 3 is a section on the line 3—3, Fig. 1; and Fig. 4 is a view of a modified form.

In the drawings the numerals 2 and 3 designate elliptic springs of any desired construction, the leaves of each spring being bound together by the ordinary spring-bands 4. While I have illustrated my invention in duplicate form it will be obvious that any number of springs may be connected up in accordance with my invention. The springs 2 and 3 are connected at their ends by means of the bolts 5, said bolts passing through the openings 6 at the ends of said springs, and washers 7 may be interposed between the heads of said bolts and the springs. Nuts 5ª engage the threaded ends of said bolts, or the bolts may be riveted as at 5ᵇ. In order to separate or space the springs properly I interpose between the springs the helical springs 8, said springs encircling the bolts 7. Washers 9 are interposed between the springs 8 and the sides of the springs 2 and 3. The washers 9 are dished as at 10 and have the peripheral grooves 11 which form sears for the springs 8. The springs 8 are compressed by tightening the nuts 5ª when the springs 2 and 3 are connected together and the tendency of said springs is to force said springs 2 and 3 apart. When my improved spring is in use and any wear takes place which would tend to cause said separators and bolts to rattle, the springs 8 being under compression will expand and take up any such wear as to hold the parts all securely together against rattling. In case the springs 8 become dead or lose their resiliency the connecting bolts may be removed and the springs 8 replaced with new ones. Or by tightening up the nuts 5ª the spring may be further compressed to give the required efficiency.

In Fig. 4 I have shown a modified form of my invention in which the washers 12 have the flat rear faces 13 and the bosses 14.

By my invention I provide a spring which is substantially free from rattling and in which any wear is taken up automatically, while at the same time there is no danger of the wearing of the connecting bolt so as to weaken the same, and cause the parting of such bolt which may result in serious accident.

What I claim is:

1. The combination of two or more elliptic springs, means for connecting the same, means for separating said springs, and means for automatically taking up the wear between said springs.

2. The combination of two or more elliptic springs, means for connecting the same together, and a resilient separating member interposed between said springs.

3. The combination of two or more elliptic springs, means for connecting the same together and a spring separating member interposed between said springs.

4. The combination of two or more elliptic springs, means for connecting the same together, and a helical spring separating member interposed between said springs.

5. The combination of two or more sets of springs, a bolt connecting said springs, a helical spring surrounding said bolt and interposed between said springs.

6. The combination of two or more sets of springs, a bolt connecting said springs, a resilient helical separating member surrounding said bolt and interposed between said springs.

7. The combination of two or more elliptic springs, a bolt connecting the same, a helical spring surrounding said bolt between said springs, and washers interposed between said spiral spring and said springs.

8. The combination of two or more elliptic springs, a bolt connecting the same, a helical spring surrounding said bolt between said springs, and dished washers interposed between said spiral spring and said springs.

9. The combination of two or more elliptic springs, a bolt connecting the same, a helical spring surrounding said bolt between said springs, and washers having annular seats to receive said spring.

10. The combination of two or more elliptic springs, means for connecting the same, a helical spring interposed between said springs, and means for compressing said spiral spring.

In testimony whereof, I the said WILLIAM G. PRICE have hereunto set my hand.

WILLIAM GUNN PRICE.

Witnesses:
ROBERT C. TOTTEN,
J. R. KELLER.